June 8, 1926.

G. H. SCANLAN 1,588,273

TRACTOR AND GUIDE

Filed April 12, 1920

WITNESSES

INVENTOR
GEORGE H. SCANLAN,
BY
ATTORNEYS

June 8, 1926.
G. H. SCANLAN
TRACTOR AND GUIDE
Filed April 12, 1920
1,588,273
2 Sheets-Sheet 2
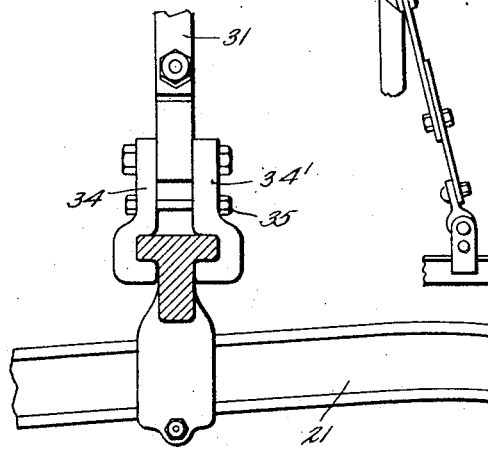
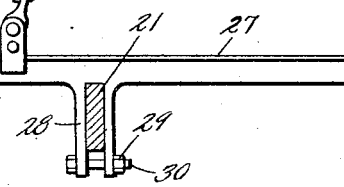
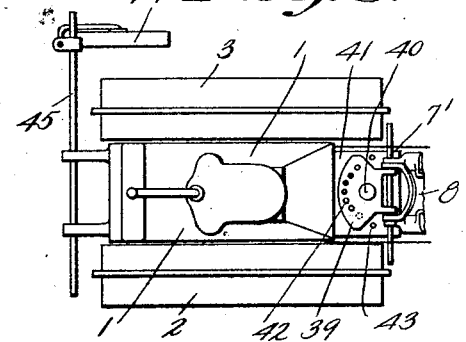
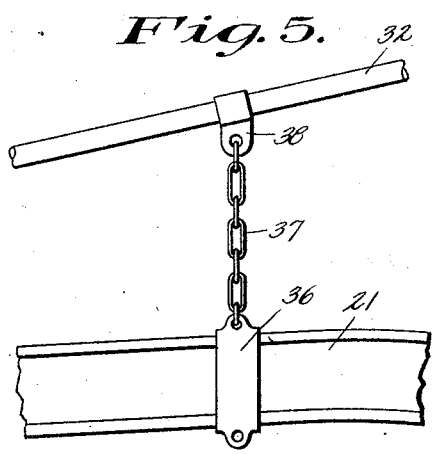
WITNESSES
E. A. Wilson
A. L. Kitchin
INVENTOR
GEORGE H. SCANLAN,
BY
Munn & Co
ATTORNEYS Patented June 8, 1926.

1,588,273

UNITED STATES PATENT OFFICE.

GEORGE H. SCANLAN, OF NEW YORK, N. Y.; MARY G. SCANLAN ADMINISTRATRIX OF SAID GEORGE H. SCANLAN, DECEASED.

TRACTOR AND GUIDE.

Application filed April 12, 1920. Serial No. 373,113.

This invention relates to tractors and plows and has for an object to provide an improved construction of plow connection whereby the plow may be shifted easily in a transverse direction to the direction of movement of the tractor.

Another object of the invention is to provide a tractor with steering handles, including a plow hitch and means for the hitch and also part of the plow for presenting a connection whereby the plow beam may be shifted so that the plow will operate on a central line or back of one of the wheels thereof.

A further object of the invention is to provide a tractor and hitch structure in which a transversely positioned bar is used and a sliding connection between the bar and the plow for connecting the plow at any desired point along the bar without materially affecting the draft or the steering handles associated with the plow and tractor.

An additional object is to provide a tractor and a plow connection or hitch therefor in which the plow may be shifted laterally to a great extent and the steering handles may also be shifted to agree with the shifting of the plow so that a proper connection may be maintained between these parts.

A further object is to provide a tractor and plow hitch with means so formed as to permit the plow to be shifted to plow centrally of the tractor or back of one of the wheels and associated with guiding and supporting castor wheels, both at the front and back, adjustable to suit the position of the plow.

In the accompanying drawing, Figure 1 is a top plan view of a tractor and hitch and associated parts disclosing an embodiment of the invention.

Figure 3 is a fragmentary sectional view through Figure 1 on line 3—3 on an enlarged scale.

Figure 4 is a detail fragmentary sectional view through Figure 1 on line 4—4, the same being on an enlarged scale.

Figure 5 is a fragmentary side view of part of a plow beam and flexible connections for connecting the same with a handle.

Figure 6 is a top plan view of a tractor and part of a steering handle showing a modified form of the invention to that illustrated in Figure 1.

Figure 1:
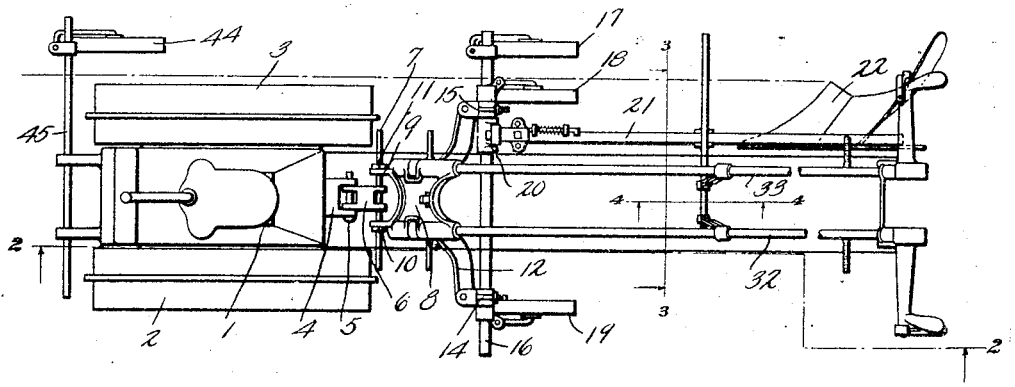
Figure 2:
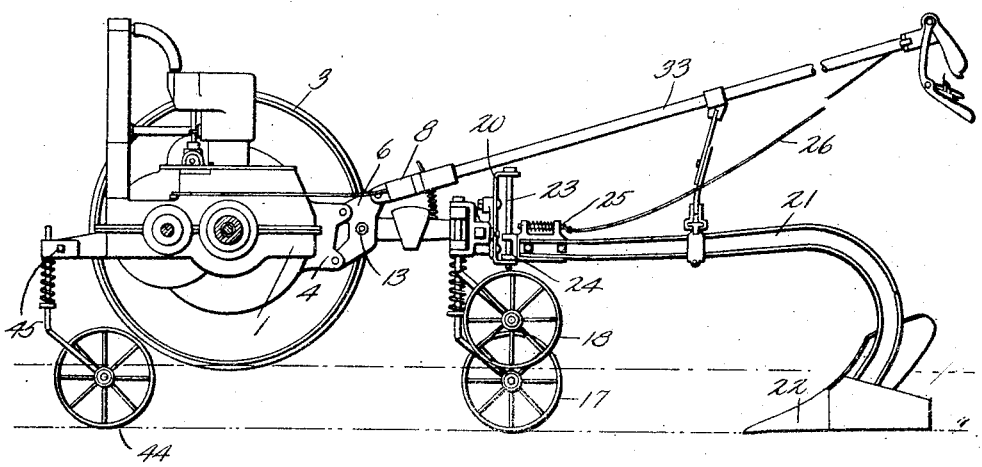
Figure 2 is a sectional view of Figure 1 approximately on line 2—2

Referring to the accompanying drawings by numeral, 1 indicates a tractor of any desired kind having bull wheels 2 and 3. A bifurcated member 4 projects from the casing of the engine 1 and carries two transverse pivots 5 which connect a link 6 with the projection 4. The link 6 supports a rod 7, which may be secured in place by a set screw or other suitable fastening means, said bar extending an appreciable distance on each side of link 6. A fitting 8, having ears 9 and 10 is journaled on the bar 7 and locked against lateral movement by suitable collars 11 clamped to the rod 7 by set screws or other suitable means. By this arrangement, the fitting 8 may be adjusted transversely to any desired extent. A yoke 12 is pivotally connected at 13 to the link member 6, said yoke carrying fittings 14 and 15 at its outer ends, said fittings accommodating a square rod 16. This rod is preferably longer than the width of the tractor, as indicated in Figure 1, and carries castor wheels 17, 18 and 19, said castor wheels being adjustable along the rod so as to be positioned at any point between the ends. As shown in Figures 1 and 2, wheel 17 is positioned in the furrow, while the wheels 18 and 19 rest on the unplowed ground. A fitting 20 is slidingly positioned on the rod 16, said fitting being connected with the beam 21 of plow 22. As indicated in Figure 2, the connection of the beam 21 with fitting 20 includes a vertical rod 23 on which the member 24 slidingly fits, said member being bolted or otherwise rigidly secured to beam 21. A spring catch 25 is carried by member 24 and when the beam 21 is tilted upward, said catch snaps over the upper end of member 20 so as to lock the beam in an elevated position and thereby cause the plow 22 to leave the ground. By pulling the cord 26, the catch is released and the plow will automatically move into the ground as the tractor moves forwardly. In order to raise the plow beam 21, a specially constructed bar 27 (Figures 3 and 4) is provided, said bar having dependent members 28 and 29 adapted to straddle the beam 21 so as to be clamped thereon by the bolt 20. A pair of adjustable bars 31 is provided for each of the handles 32 and 33, each of said bars being pivotally connected or otherwise connected to a pair of pinching fittings 34' and 34 clamped to the bar 27 at any desired point by the bolt 35. When the plow 22 and associated parts are moved to one side, as shown in Figure 1, the links 31 are connected to bar 27 near one end so that when the handles are raised, the beam 21 may be tilted. If desired, the handles 32 and 33 may be shifted laterally toward the wheel 3 so that the handles may be more nearly over the beam 21. A shift of the handles as described is usually desirable when a flexible connection is provided between the handles and the beam 21, as shown in Figure 5. This flexible connection consists of a fitting 36 of any desired kind, to which a chain or other flexible means 37 is connected, said chain being also connected to a fitting 38 clamped to the handle.

If desired, instead of providing a transverse sliding movement for the handles 32 and 33, said handles may be moved pivotally, as shown in Figure 6. The bar 7' connects the fitting 8 with a horizontally swinging plate 39 pivotally connected at 40 to a suitable extension 41 projecting from the casing of engine 1. A plurality of apertures 42 is arranged in the plate 39, and also a plurality of apertures 43 is arranged in the extension 41 so that by placing a pin in any of the apertures 42 and causing the same to project into one of the apertures 43, the parts will be locked in a given position, either in direct line with the direction of movement of the tractor or at an angle thereto. In this way, the fitting 8 and handles connected therewith may be swung to either side of the tractor or to any intermediate point.

From Figures 1 and 2, it will be noted that wheel 18 is on the unplowed ground and assists in preventing the tractor from tilting to any appreciable extent. In addition, a front castor 44 is provided which is adjustably mounted on a rod 45 so that it may be positioned on either side of the tractor or, if desired, in front of the tractor. This acts as a guiding and balancing member, sometimes desirable, as, for instance, where the ground is very loose.

What I claim is:

1. In combination with a two wheeled tractor carrying a transverse rod, and caster wheels adjustable on said rod, handles extending rearwardly from said tractor, a plow beam connected to said transverse rod by a vertical pivot and adjustable vertically and laterally on said rod, a transverse bar clamped on said beam and extending on both sides thereof, clamps adjustable along said bar, and links connecting said clamps to said handles.

2. In combination with a two wheeled tractor carrying a transverse rod and caster wheels adjustable on said rod, handles extending rearwardly from said tractor, a plow beam connected to said rod by a vertical pivot and adjustable vertically and laterally on said rod, a transverse bar having a U-shaped section adapted to straddle said beam and means for clamping said U-shaped section on the beam, adjustable links extending from said plow handles, and clamps adjustable along said transverse bar, said adjustable links connecting the handles to the clamps.

GEORGE H. SCANLAN.